US011139564B2

(12) United States Patent
Park et al.

(10) Patent No.: US 11,139,564 B2
(45) Date of Patent: Oct. 5, 2021

(54) ELECTRONIC DEVICE INCLUDING ANTENNA

(71) Applicant: Samsung Electronics Co., Ltd., Suwon-si (KR)

(72) Inventors: Sung Chul Park, Suwon-si (KR); Hyung Wook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/733,054

(22) PCT Filed: Nov. 2, 2018

(86) PCT No.: PCT/KR2018/013249
§ 371 (c)(1),
(2) Date: May 1, 2020

(87) PCT Pub. No.: WO2019/088756
PCT Pub. Date: May 9, 2019

(65) Prior Publication Data
US 2020/0295450 A1  Sep. 17, 2020

(30) Foreign Application Priority Data

Nov. 2, 2017 (KR) .......................... 10-2017-0145365

(51) Int. Cl.
*H04B 1/401* (2015.01)
*H01Q 1/42* (2006.01)
(Continued)

(52) U.S. Cl.
CPC ................. *H01Q 1/42* (2013.01); *H01Q 1/38* (2013.01); *H01Q 1/50* (2013.01); *H04B 1/401* (2013.01)

(58) Field of Classification Search
CPC ... H01Q 1/42; H01Q 1/38; H01Q 1/50; H04B 1/401
(Continued)

(56) References Cited

U.S. PATENT DOCUMENTS 8,049,506 B2   11/2011   Lazarev
8,644,197 B2   2/2014    Lee et al.
(Continued)

FOREIGN PATENT DOCUMENTS

KR   10-2011-0130389 A   12/2011
KR   10-2016-0031234 A   3/2016

OTHER PUBLICATIONS

International Search Report and Written Opinion of the International Searching Authority in connection with International Application No. PCT/2018/013249 dated Jan. 25, 2019, 11 pages.

*Primary Examiner* — Peguy Jean Pierre

(57) ABSTRACT

An electronic device according to an embodiment disclosed in the present document comprises: a housing; a first antenna element placed on the housing, or at a first position inside the housing; a second antenna element placed on the housing, or at a second position inside the housing; a communication processor; and at least one communication circuit electrically connected to the first antenna element and the second antenna element, wherein the at least one communication circuit can comprise: a first RF circuit, which generates an IF signal having a first frequency, a local oscillation (LO) signal of a second frequency lower than the first frequency, and a control signal of a third frequency lower than the second frequency; a second RF circuit, which provides, to the second antenna element, an RF signal of a fourth frequency higher than the third frequency and lower than the second frequency; and a third RF circuit, which receives the IF signal from the first RF circuit, up-converts the IF signal, and provides the up-converted signal to the first antenna
(Continued)

element. In addition, various embodiments identified through the specification are possible.

16 Claims, 10 Drawing Sheets

(51) Int. Cl.
  *H01Q 1/38* (2006.01)
  *H01Q 1/50* (2006.01)
(58) Field of Classification Search
  USPC .......................................................... 343/872
  See application file for complete search history.

(56) References Cited

U.S. PATENT DOCUMENTS

| | | | |
|---|---|---|---|
| 8,670,322 B2 | 3/2014 | Yehezkely et al. | |
| 8,965,303 B2 | 2/2015 | Yang et al. | |
| 9,496,948 B2 | 11/2016 | Yehezkely et al. | |
| 9,525,439 B2 | 12/2016 | Yehezkely | |
| 10,284,364 B2 | 5/2019 | Park et al. | |
| 2009/0201084 A1* | 8/2009 | See | H03F 3/211 330/51 |
| 2010/0157858 A1 | 6/2010 | Lee et al. | |
| 2010/0213942 A1 | 8/2010 | Lazarev | |
| 2012/0307695 A1 | 12/2012 | Yehezkely et al. | |
| 2012/0309331 A1 | 12/2012 | Yehezkely et al. | |
| 2014/0185500 A1 | 7/2014 | Yehezkely et al. | |
| 2014/0378074 A1 | 12/2014 | Yang et al. | |
| 2015/0087248 A1 | 3/2015 | Yehezkely | |
| 2016/0204499 A1 | 7/2016 | Toh et al. | |
| 2017/0093019 A1 | 3/2017 | Toh et al. | |
| 2020/0153476 A1* | 5/2020 | Burke | H04B 1/0475 |

\* cited by examiner

ELECTRONIC DEVICE INCLUDING ANTENNA

CROSS-REFERENCE TO RELATED APPLICATIONS

This application is a 371 National Stage of International Application No. PCT/KR2018/013249, filed Nov. 2, 2018, which claims priority to Korean Patent Application No. 10-2017-0145365, filed Nov. 2, 2017, the disclosures of which are herein incorporated by reference in their entirety.

BACKGROUND

1. Field

Embodiments disclosed in the disclosure relate to a 5G antenna technology included in an electronic device.

2. Description of Related Art

With the rapid increase in mobile traffic, a fifth generation (5G) mobile communication technology based on an ultra-high-bandwidth frequency of 20 GHz or more has been developed. The ultra-high-bandwidth frequency signal may also include millimeter waves having a frequency band of 20 GHz to 300 GHz. When an ultra-high-bandwidth frequency is used, the wavelength may be shortened, so small-size and light-weight antennas and devices are possible. In addition, a larger number of antennas may be mounted in the same area due to a shorter wavelength, so a signal may be intensively transmitted in a specified direction. In addition, as the bandwidth is widely used, a larger amount of information may be transmitted.

SUMMARY

The electronic device may mount existing antennas including a 4G antenna and the 5G antenna together. A plurality of antennas mounted on the electronic device may be connected with the communication circuit through a cable.

The high frequency of 20 GHz or more used in the 5G antenna has strong straightness and high path loss. For example, when the 5G antenna is mounted on the electronic device, a radio frequency integrated circuit (RFIC) for the 5G antenna may be positioned to be close to the 5G antenna. For example, a 5G antenna may be placed away from an intermediate frequency integrated circuit (IFIC) or processor. The RFIC and IFIC, and the RFIC and the processor may be electrically connected through a cable.

The electronic device may include a plurality of cables for connecting an existing antenna to the 5G antenna. Accordingly, a plurality of cables may significantly occupy an inner space of the electronic device.

According to an embodiment disclosed in the disclosure, the electronic device may connect communication circuits to support other frequencies with the antennas through one cable.

According to an embodiment disclosed in the disclosure, an electronic device may include a housing, a first antenna element provided in a first position inside the housing, a second antenna element provided on the housing or in a second position inside the housing, a communication processor (CP), and at least one communication circuit positioned inside the housing and electrically connected to the first antenna element and the second antenna element. The at least one communication circuit may include a first RF circuit that is electrically connected to the CP and generates an IF signal having a first frequency, a local oscillation (LO) signal having a second frequency lower than the first frequency, and a control signal having a third frequency lower than the second frequency, a second RF circuit that provides an RF signal, which has a fourth frequency higher than the third frequency and lower than the second frequency, to the second antenna element, and a third RF circuit that receives the IF signal from the first RF circuit, up-converts the IF signal, and provides the up-converted signal to the first antenna element. The communication circuit may transmit the IF signal and the RF signal via a single electrical path.

According to an embodiment disclosed in the disclosure, an electronic device may include a housing, a first antenna element disposed to be adjacent to the housing, a first RF circuit disposed to be adjacent to the first antenna element, and electrically connected to the first antenna element, a second antenna element formed on the housing, or received inside the housing, a second RF circuit connected to the second antenna element through a cable, an IF circuit connected to the first RF circuit through the cable, and disposed to be adjacent to the second RF circuit, at least one multiplexer device electrically connected to the cable, to split a second RF signal associated with the second RF circuit, and an IF signal associated with the IF circuit, and at least one processor electrically connected to the first RF circuit, the second RF circuit, and the IF circuit. The at least one processor may receive the IF signal split by the at least one multiplexer device using the first RF circuit or the IF circuit, receive the second RF signal split by the at least one multiplexer device using the second antenna element or the second RF circuit, transmit and receive the first RF signal in a frequency band of 20 GHz or more using the first antenna element, the IF circuit, and the first RF circuit, and transmit and receive the second RF signal in a frequency band of 6 GHz or less using the second antenna element and the second RF circuit.

According to an embodiment disclosed in the disclosure, the number of cables to be mounted in the electronic device is reduced, thereby ensuring the inner space of the electronic device and reducing cost.

Besides, a variety of effects directly or indirectly understood through the disclosure may be provided.

DETAILED DESCRIPTION

Figure 1A:
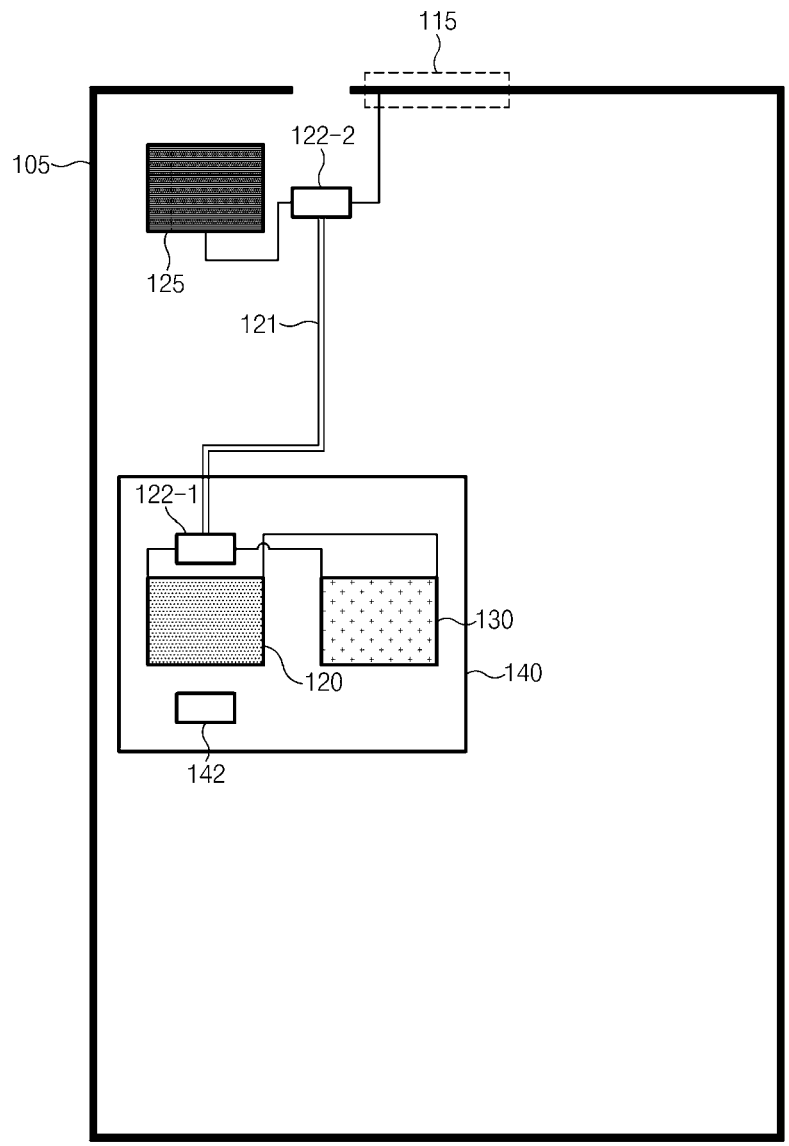
FIG. 1A is a perspective view of an electronic device, according to an embodiment of the disclosure.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

Figure 1B:
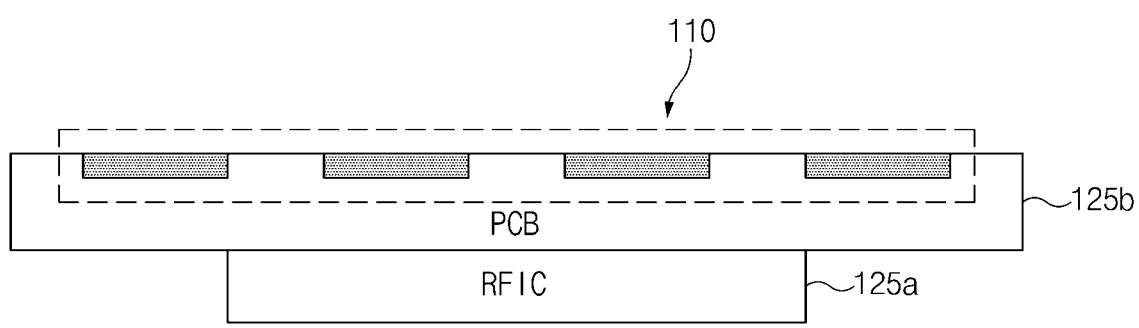
FIG. 1B is an example of an RF module, according to an embodiment of the disclosure.

FIG. 1A is a perspective view of an electronic device according to an embodiment of the disclosure. FIG. 1B is an example of an RF module, according to an embodiment of the disclosure.

Referring to FIGS. 1A and 1B, according to an embodiment, an electronic device 100 includes a housing 105, an RF module 125 (e.g., a 5G RF module), a first RF circuit 120 (e.g., a 5G IFIC), a second antenna element 115, a second RF circuit 130 (e.g., 4G RFIC) for the second antenna element 115, a cable 121 (e.g., a single electrical path), multiplexer devices 122-1 and 122-2, and a processor 142.

Referring to FIG. 1B, according to an embodiment, the RF module 125 may include a first antenna element 110 (e.g., a 5G antenna array) and a third RF circuit 125a (e.g., a 5G RFIC). The third RF circuit 125a may be disposed to be adjacent to the first antenna element 110. For example, the first antenna element 110 may be referred to as an antenna array formed on a PCB 125b. The structure of the RF module 125 illustrated in FIG. 1B is provided for the illustrative purpose, but is not limited thereto.

In one embodiment, the electronic device 100 may include the housing 105. At least a part of the housing 105 may be formed of, for example, a conductive material.

In one embodiment, the electronic device 100 may include the first antenna element 110. The first antenna element 110 may be disposed inside the housing 105 to be adjacent to the housing 105.

In one embodiment, the electronic device 100 may include the third RF circuit 125a disposed to be adjacent to the first antenna element 110 and electrically connected directly to the first antenna element 110. For example, the first antenna element 110 may be powered by the third RF circuit 125a. The electronic device 100 may include the first RF circuit 120 (e.g., 5G IFIC) connected to the third RF circuit 125a through the cable 121, and disposed to be adjacent to the second RF circuit 130.

In various embodiments, the first antenna element 110 may be referred to as an antenna array (e.g., an antenna array 510 of FIG. 5 and antenna arrays 641_1 and 641_2 of FIG. 6) including a plurality of conductive radiators. For example, the first antenna element 110 may be referred to as a 5G antenna to support a high frequency of 20 GHz or more. For example, for directivity of the antenna signal, the first antenna element 110 may include an antenna array.

In various embodiments, an IF signal generated from the first RF circuit 120 (e.g., 5G IFIC) may be transmitted to the third RF circuit 125a through the cable 121. The third RF circuit 125a may generate a first RF signal by up-converting the IF signal. The generated first RF signal may be transmitted to the first antenna element 110. For another example, the third RF circuit 125a may generate the IF signal by down-converting the first RF signal received by the first antenna element 110. The generated IF signal may be transmitted to the first RF circuit 120 (e.g., 5G IFIC) through the cable 121.

In one embodiment, the electronic device 100 may include the second antenna element 115 and the second RF circuit 130 connected to the second antenna element 115 through the cable 121. For example, the second antenna element 115 may be formed on the housing 105 or received in the housing 105. The second RF circuit 130 may be disposed inside the housing 105. Referring to FIG. 1A, the second antenna element 115 formed in a bezel area of the housing 105 is illustrated. However, the position of the second antenna element 115 is not limited thereto.

In various embodiments, the second antenna element 115 may be referred to as a conductive radiator (not illustrated). The conductive radiator may be formed on the housing 105 or disposed within the housing 105.

For example, at least a portion of the housing 105 may be formed of a conductive material. The conductive radiator may be formed in the conductive area of at least a portion of the housing 105. Referring to FIG. 1A, the electronic device 100, in which the second antenna element 115 is formed on the housing 105, is illustrated.

In one embodiment, a second RF signal may be received from the second antenna element 115 through the cable 121. The received second RF signal may be transmitted to the second RF circuit 130. Alternatively, a second RF signal generated from the second RF circuit 130 may be transmitted to the second antenna element 115. For another example, an IF signal may be transmitted and received between the first RF circuit 120 (e.g., 5G IFIC) and the third RF circuit 125a through the cable 121. For example, the second RF signal and the IF signal may be integrally transmitted and received through one cable 121.

In one embodiment, the electronic device 100 may include the multiplexer devices 122-1 and 122-2 electrically connected to the cable 121. The multiplexer devices 122-1 and 122-2 may split the second RF signal associated with the second RF circuit 130 and the IF signal associated with the first RF circuit 120 (e.g., 5G IFIC) from each other. Since the second RF signal and the IF signal are transmitted and received through one cable 121, a receiver may receive a target signal split through the multiplexer devices 122-1 and 122-2. For example, the multiplexer devices 122-1 and 122-2 may include a multiplexer or a notch filter.

In one embodiment, the electronic device 100 may include at least one processor 142 electrically connected to the second RF circuit 130, the third RF circuit 125a, and the first RF circuit 120. For example, the at least one processor 142 may be referred to as an application processor (AP) and/or a communication processor (CP). For example, an IF circuit may be included in the communication processor. Referring to FIG. 1A, the electronic device 100 including the processor 142 serving as the application processor is illustrated. The processor 142 may, for example, directly or indirectly control the second RF circuit 130, the third RF circuit 125a, and the first RF circuit 120.

In one embodiment, the processor 142 may control the second antenna element 115 or the second RF circuit 130 to receive a second RF signal split by at least one multiplexer device 122-1 or 122-2. For example, the second antenna element 115 may receive the second RF signal split by the multiplexer device 122-2. For example, the second RF circuit 130 may receive the second RF signal split by the multiplexer device 122-1, and may perform specified processing.

In one embodiment, the processor 142 may control the third RF circuit 125a or the first RF circuit 120 to receive an IF signal split by the at least one multiplexer device 122-1 or 122-2. For example, the third RF circuit 125a may receive an IF signal split by the multiplexer device 122-2, and the first RF circuit 120 may receive an IF signal split by the multiplexer device 122-1.

In one embodiment, the processor 142 may be configured to transmit and receive a second RF signal in a frequency band of less than 6 GHz using the second antenna element 115 and the second RF circuit 130. For example, the second antenna element 115 may be referred to as a 4G antenna.

In one embodiment, the processor 142 may be configured to transmit and receive a first RF signal in a frequency band of 20 GHz or more using the first antenna element 110, the first RF circuit 120, and the third RF circuit 125*a*. For example, the first antenna element 110 may be referred to as a 5G antenna, or mmWave antenna.

In one embodiment, the electronic device 100 may include a PCB 140 disposed inside the housing 105. For example, the first RF circuit 120 and the second RF circuit 130 may be disposed on the PCB 140. For example, the PCB 140 may be referred to as a main PCB. The processor 142 may be, for example, disposed on the PCB 140.

According to various embodiments, the electronic device 100 may include at least one multiplexer device 122-1 or 122-2, which is electrically connected to the cable 121, to split the second RF signal, the IF signal associated with the first RF circuit 120, and a control signal, a local oscillator (LO) signal. The second RF signal, the IF signal, the control signal, or the LO signal may be transmitted or received through one cable 121.

Figure 2:
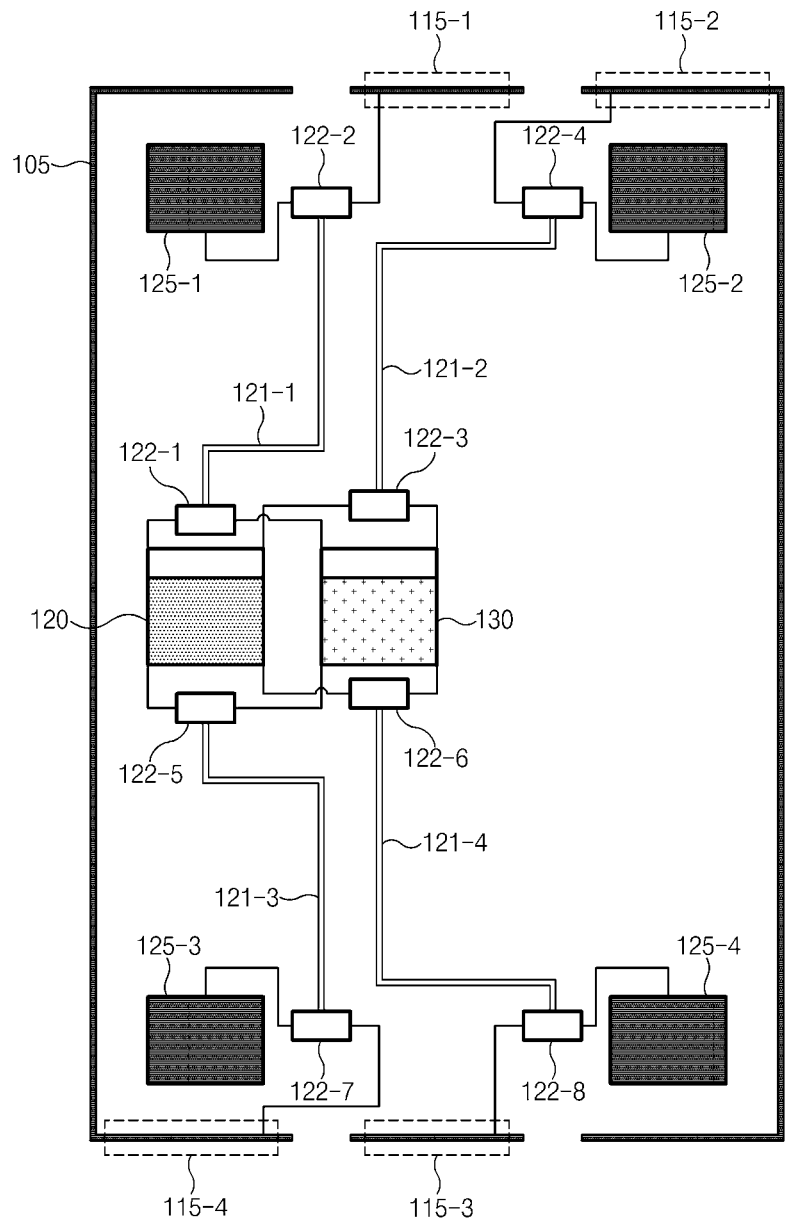
FIG. 2 is a perspective view illustrating an electronic device including a plurality of first antenna elements and a plurality of second antenna elements, according to various embodiments of the disclosure.

FIG. 2 is a perspective view illustrating an electronic device including a plurality of second antenna elements and a plurality of first antenna elements, according to various embodiments of the disclosure.

In various embodiments, the electronic device 100 may include a plurality of RF modules 125-1 to 125-4 (e.g., 5G RF modules) and a plurality of second antenna elements 115-1 to 115-4. Referring to FIG. 2, the electronic device 100, in which four RF modules and four second antenna elements are mounted, is illustrated.

In one embodiment, the plurality of RF modules 125-1 to 125-4 (e.g., the RF module 125 of FIG. 1A) may include a first antenna element (e.g., the first antenna element 110 of FIG. 1B) and a third RF circuit (e.g., the third RF circuit 125*a* of FIG. 1B). The positions of the plurality of RF modules 125-1 to 125-4 are provided for the illustrative purpose, and are not limited thereto. The plurality of RF modules 125-1 to 125-4 may be disposed to be adjacent to the housing 105.

In one embodiment, the first antenna element may be electrically connected to a third RF circuit disposed to be adjacent to the first antenna element. For example, when the first antenna element that transmits and receives a first RF signal in a frequency band of 20 GHz or more is mounted, a third RF circuit for the first antenna element may be disposed to be adjacent to the first antenna element. For example, when a plurality of first antenna elements are mounted at positions spaced apart from each other, a plurality of third RF circuits for the first antenna elements, respectively, may be mounted In one embodiment, the plurality of third RF circuits included in the plurality of RF modules 125-1 to 125-4 may be connected to the first RF circuit 120 through a plurality of cables 121-1 to 121-4. The IF signal generated from the first RF circuit 120 (e.g., the 5G IFIC) may be transmitted to the plurality of third RF circuits through the plurality of cables 121-1 to 121-4

Referring to FIG. 2, each of the plurality of second antenna elements 115-1 to 115-4 may be referred to as the second antenna element 115 of FIG. 1A. The positions of the plurality of second antenna elements 115-1 to 115-4 illustrated in FIG. 2 are provided for the illustrative purpose, and are not limited thereto.

In one embodiment, the plurality of second antenna elements 115-1 to 115-4 may be connected to the second RF circuit 130 through the cables 121-1 to 121-4.

In one embodiment, the IF signal, which is associated with the first RF circuit 120, and the second RF signal, which is associated with the second RF circuit 130, are transmitted and received through the plurality of cables 121-1 to 121-4 and may be split through at least one multiplexer devices 122-1 to 122-8.

Referring to FIG. 2, the cables 121-1 to 121-4 may be placed to connect the first RF circuit 120 to a plurality of third RF circuits included in the RF modules 125-1 to 125-4. The plurality of second antenna elements 115-1 to 115-4 and the plurality of RF modules 125-1 to 125-4 may share the cables 121-1 to 121-4.

Figure 3:
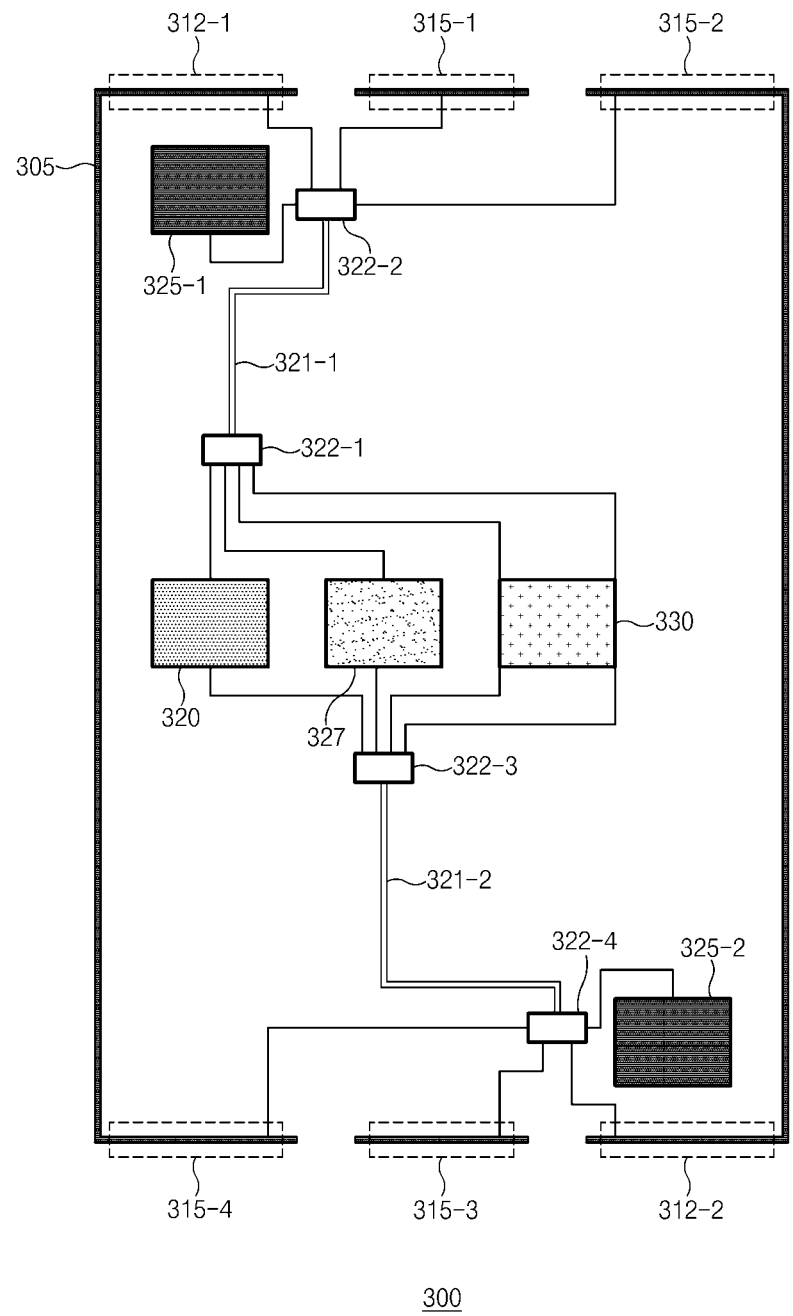
FIG. 3 is a perspective view illustrating an electronic device including a plurality of first antenna elements, a plurality of second antenna elements, and a plurality of third antenna elements, according to various embodiments of the disclosure.

FIG. 3 is a perspective view illustrating an electronic device including first antenna elements, second antenna elements, and third antenna elements, according to various embodiments of the disclosure.

Referring to FIG. 3, according to an embodiment, an electronic device 300 (e.g., the electronic device 100 of FIG. 1A) includes a housing 305 (e.g., the housing 105 of FIG. 1A), a plurality of RF modules 325-1 and 325-2 (e.g., the RF module 125 in FIG. 1A), a first RF circuit 320 (e.g., the first RF circuit 120 in FIG. 1A), a plurality of second antenna elements 315-1 to 315-4 (e.g., the second antenna element 115 of FIG. 1A), and a second RF circuit 330 (e.g., the second RF circuit 130 of FIG. 1A) for the plurality of second antenna elements 315-1 to 315-4, a plurality of cables 321-1 and 321-2 (e.g., the cable 121 of FIG. 1A), and a plurality of multiplexer devices 322-1 to 322-4 (e.g., the multiplexer devices 122-1 and 122-2 of FIG. 1A). Hereinafter, the duplicated description of FIGS. 1A, 1B, and 2 will be omitted.

In an embodiment, the electronic device 300 may include third antenna elements 312-1 and 312-2 formed on the housing 305 or received in the housing 305. In one embodiment, the electronic device 300 may include a fourth RF circuit 327 which is connected to the third antenna elements 312-1 and 312-2 through the cables 321-1 and 321-2, and disposed to be adjacent to the second RF circuit 330. For example, the second RF circuit 330, the first RF circuit 320, and the fourth RF circuit 327 may be disposed on the main PCB (e.g., the main PCB 140 of FIG. 1A).

In one embodiment, at least one processor (e.g., the processor 142 of FIG. 1A) of the electronic device 300 may be configured to transmit or receive a third RF signal in a frequency band of 6 GHz or less using the third antenna elements 312-1 and 312-2, and the fourth RF circuit 327.

In one embodiment, the third antenna elements 312-1 and 312-2 may be referred to as sub-antennas to assist the first antenna elements (e.g., the first antenna element 110 of FIG. 1B) included in the RF modules 325-1 and 325-2. The third RF signal may have a frequency band adjacent to that of the second RF signal of the second antenna elements 315-1 to 315-4, and may have a bandwidth wider than the bandwidth of the second RF signal. For example, the second RF signal and the third RF signal may have a frequency band of 6 GHz or less. For example, the second RF signal may have a bandwidth of about 40 MHz, and the third RF signal may have a bandwidth of about 100 MHz or more.

In various embodiments, the third antenna elements 312-1 and 312-2 may be referred to as third conductive radiators (not illustrated). The third conductive radiator may be, for example, formed on the housing 305 or disposed inside the housing 305. For example, at least a portion of the housing 305 may be formed of a conductive material. The third conductive radiator may be formed in the conductive area at least of a portion of the housing 305. Referring to FIG. 3, the electronic device 300, in which the third antenna elements 312-1 and 312-2 are formed on the housing 305, is illustrated.

In one embodiment, the third RF signal received from the third antenna elements 312-1 and 312-2 through the cables 321-1 and 321-2 may be transmitted to the fourth RF circuit 327. For another example, the third RF signal generated from the fourth RF circuit 327 may be transmitted to the third antenna elements 312-1 and 312-2 through the cables 321-1 and 321-2.

In one embodiment, signals for antenna elements formed at one end of the housing 305 may be transmitted and received through the cable 321-1. For example, the second RF signal for the second antenna element 315-1 and 315-2, the IF signal for the RF module 325-1, and the third RF signal for the third antenna element 312-1 may be transmitted and received through the single cable 321-1. For another example, signals for antenna elements formed at an opposite end of the housing 305 may be transmitted and received through the cable 321-2. For example, the second RF signal for the second antenna elements 315-3 and 315-4, the IF signal for the RF module 325-2, and the third RF signal for the third antenna element 312-2 may be transmitted and received through the single cable 321-2.

In one embodiment, the electronic device 300 may be configured to receive the second RF signal split by the multiplexer devices 322-1 and 322-2, by using the plurality of second antenna elements 315-1 to 315-4 or the second RF circuit 330. For another example, the electronic device 300 may be configured to receive the IF signal split by the multiplexer devices 322-1 and 322-2, by using the first RF circuit 320 or the third RF circuit (e.g., the third RF circuit 125a) included in the RF modules 325-1 and 325-2. For another example, the electronic device 300 may be configured to receive the third RF signal split by the multiplexer devices 322-1 and 322-2, by using the plurality of third antenna elements 312-1 to 312-2 or the fourth RF circuit 327. The multiplexer devices 322-1 and 322-2 may include, for example, a quadplexer to split the second RF signal, the IF signal, and the third RF signal.

Figure 4A:
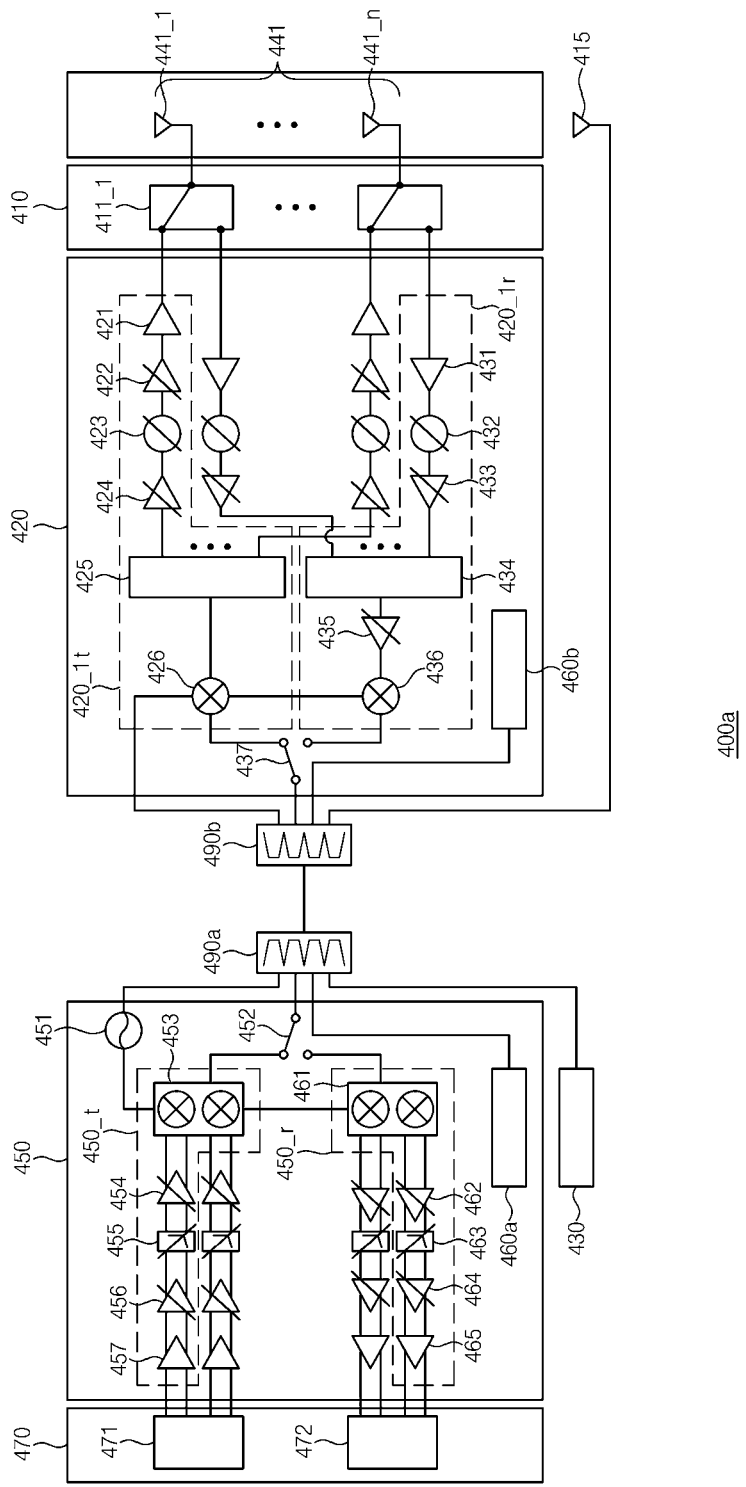
FIGS. 4A to 4C are circuit diagrams of a communication circuit, according to an embodiment of the disclosure.
Figure 4B:
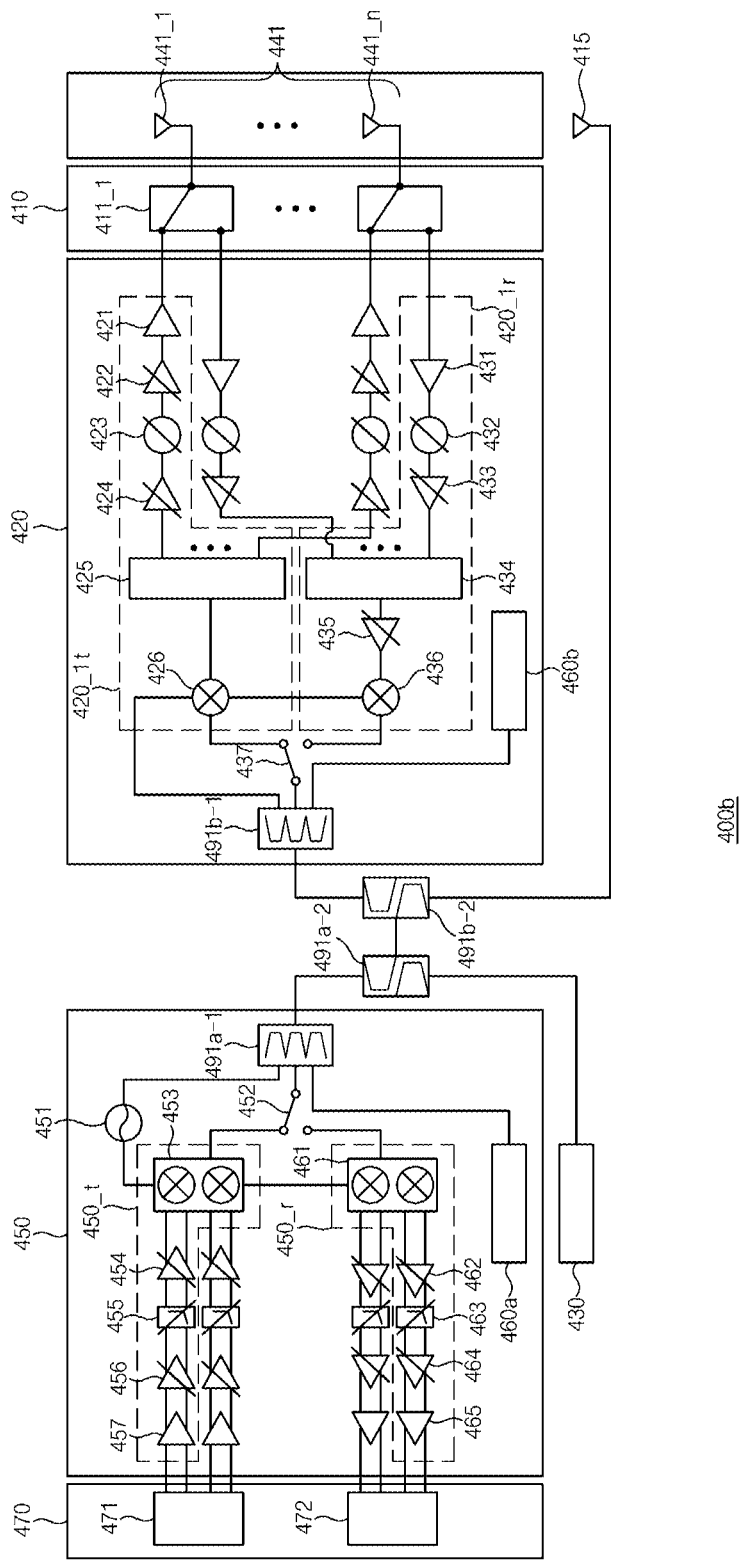
Figure 4C:
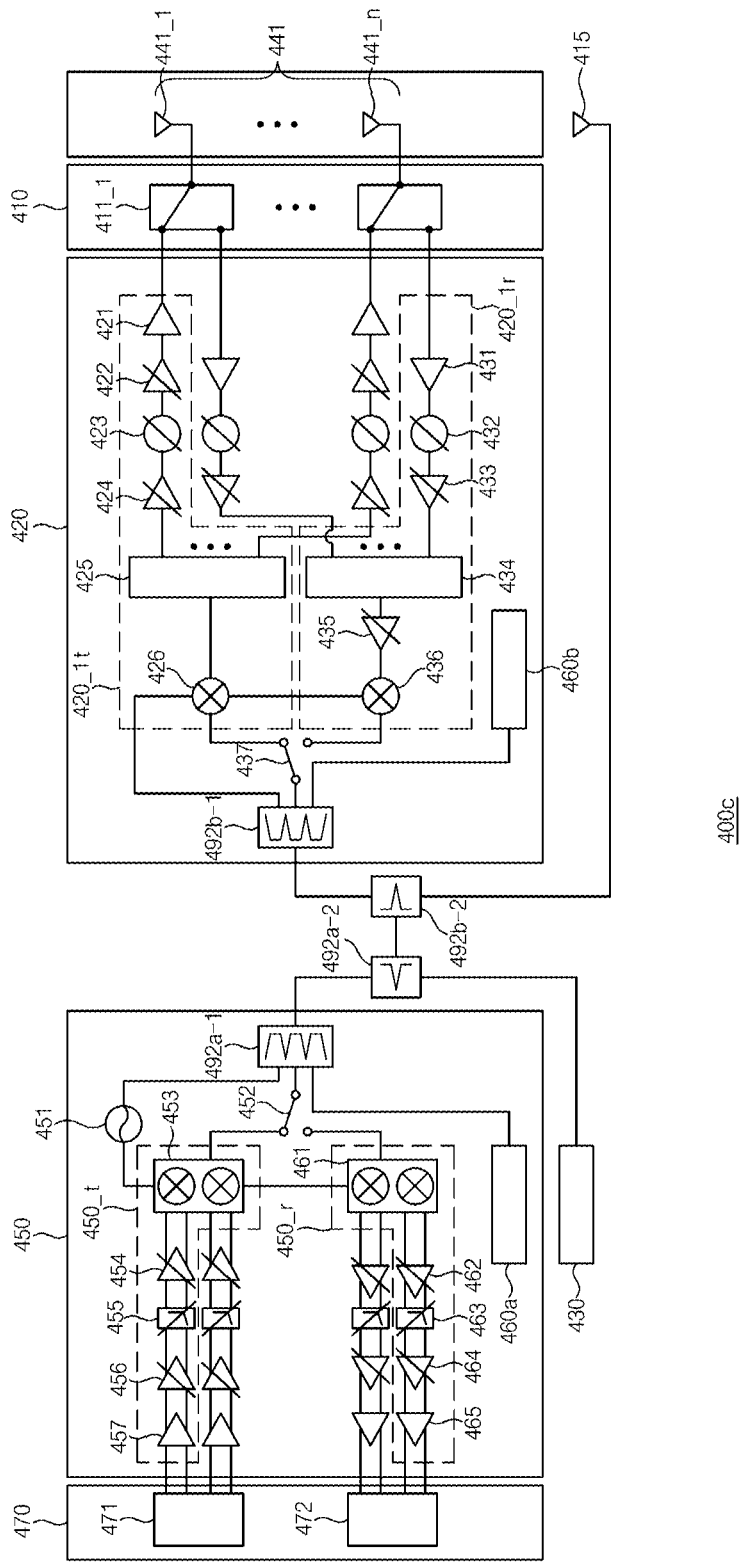

FIGS. 4A to 4C are circuit diagrams of a communication circuit included in an electronic device according to an embodiment of the disclosure.

Referring to FIGS. 4A to 4C, a communication circuit 400a, 400b, or 400c may include a third RF circuit 420 (e.g., the third RF circuit 125a of FIG. 1B, 5G RFIC) for an antenna array 441 (e.g., the first antenna element 110 of FIG. 1B), a first RF circuit 450 (e.g., the first RF circuit 120 of FIG. 1A, or 5G IFIC) for the antenna array 441, a second RF circuit 430 (e.g., the second RF circuit 130 of FIG. 1A) for a second antenna 415 (e.g., the second antenna element 115 of FIG. 1A), or a communication processor 470. Components commonly applied to FIGS. 4A to 4C will be described collectively.

According to various embodiments, the communication circuits 400a, 400b, or 400c include a switch group 410, the third RF circuit 420, the first RF circuit 450, and the communication processor 470 (e.g., the processor 142 of FIG. 1A). In various embodiments, some of the components of communication circuit 400a, 400b, or 400c may be added or omitted.

According to an embodiment, antenna elements (e.g., 441_1 and 441_n) included in the antenna array 441 may be connected to the third RF circuit 420 through a switch 411_1 included in the switch group 410. For example, when the electronic device (e.g., the electronic device 100 of FIG. 1A) transmits an RF signal (e.g., in the case of a signal transmit mode), the switch 411_1 may connect the antenna element 441_1 to a power amplifier (PA) 421. When the electronic device receives the RF signal (e.g., in the case of a signal receive mode), the switch 411_1 may connect the antenna element 441_1 to a low noise amplifier (LAN) 431.

According to an embodiment, the third RF circuit 420 may include a transmit path 420_1t and a receive path 420_1r of the RF signal.

According to an embodiment of the disclosure, when the electronic device is in the signal transmit mode, the PA 421, a first variable gain amplifier (VGA) 422, a phase shifter (PS) 423, a second VGA 424, a combiner 425, and a mixer 426 may be disposed on the transmit path 420_1t of the RF signal.

The PA 421 may amplify the power of the RF signal which is transmitted. According to an embodiment, the PA 421 may be mounted inside or outside the third RF circuit 420. The first VGA 422 and the second VGA 424 may perform an auto gain control (AGC) operation under the control of the communication processor 470. According to an embodiment, the number of VGAs may be two or more, or less than two. The PS 423 may change the phase of the RF signal depending on a beamforming angle under the control of the communication processor 470. The combiner 425 may split the RF signal received from the mixer 426 into n signals. The number n of the split signals may be equal to, for example, the number of antenna elements (e.g., 441_1 and 441_n) included in the antenna array 441. The mixer 426 may up-convert the IF signal received from the first RF circuit 450 into the RF signal. In one embodiment, the mixer 426 may receive a signal, which is to be mixed, from an internal or external oscillator. Referring to FIGS. 4A to 4C, the mixer 426, which receives a signal (LO signal) to be mixed from the local oscillator 451 of the first RF circuit 450, is illustrated.

According to an embodiment, when the electronic device is in the signal receive mode, an LNA 431, a PS 432, a first VGA 433, a combiner 434, a second VGA 435, and a mixer 436 may be disposed on the receive path 420_1r of the RF signal.

The LNA 431 may amplify the RF signal received from the antenna elements (e.g., 441_1 and 441_n). The first VGA 433 and the second VGA 435 may perform an AGC operation under the control of the communication processor 470. According to an embodiment, the number of VGAs may be two or more, or less than two. The PS 432 may change the phase of the RF signal depending on a beamforming angle under the control of the communication processor 470. The combiner 434 may combine the RF signal, the phase of which is changed to be aligned in phase. The combined signal may be transmitted to the mixer 436 through the second VGA 435. The mixer 436 may down-convert the received RF signal to the IF signal. In one embodiment, the mixer 436 may receive a signal to be mixed, from an internal or external oscillator. Referring to FIGS. 4A to 4C, the mixer 436, which receives a signal (LO signal) to be mixed from the local oscillator 451 of the first RF circuit 450, is illustrated. However, the disclosure is not limited thereto, and the local oscillator may be included in the third RF circuit 420 and/or the first RF circuit 450.

According to an embodiment, the third RF circuit 420 may further include a switch 437 electrically connecting the mixer to the first RF circuit 450. The switch 437 may selectively connect the transmit path 420_1t or the receive path 420_1r of the RF signal to the first RF circuit 450.

According to one embodiment, the first RF circuit 450 may include a transmit path 450_t, a receive path 450_r, and a switch 452 to selectively connect the transmit path 450_t or the receive path 450_r.

According to an embodiment, a mixer 453, a third VGA 454, a low pass filter (LPF) 455, a fourth VGA 456, and a buffer 457 may be disposed on the internal transmit path 450_t of the first RF circuit 450. The mixer 453 may convert a baseband Balanced in-phase/quadrature-phase (I/Q) signal to an IF signal. The LPF 455 may serve as a channel filter using a bandwidth of the baseband signal as a cut-off frequency. In one embodiment, the cut-off frequency may be variable. The third VGA 454 and the fourth VGA 456 may perform a transmit AGC operation under the control of the communication processor 470. According to an embodiment, the number of VGAs may be two or more, or less than two. The buffer 457 may serve as a buffer when receiving a balanced I/Q signal from the communication processor 470, so the first RF circuit 450 may stably process the balanced I/Q signal.

According to an embodiment, a mixer 461, a third VGA 462, a low pass filter (LPF) 463, a fourth VGA 464, and a buffer 465 may be disposed on the internal receive path 450_r of the first RF circuit 450. The functions of the third VGA 462, the LPF 463, and the fourth VGA 464 may be the same as or similar to the functions of the third VGA 454, the LPF 455, and the fourth VGA 456 disposed in the transmit path 450_t. The mixer 461 may convert an IF signal transmitted from the third RF circuit 420 into a balanced I/Q signal in the baseband. The buffer 465 may serve as a buffer when the balanced I/Q signal of the baseband that has passed through the fourth VGA 464 is transmitted to the communication processor 470, and thus the first RF circuit 450 may process the balanced I/Q signal.

According to an embodiment, the communication processor 470 may include a Tx I/Q digital analog converter (DAC) 471 and an Rx I/Q analog digital converter (ADC) 472. In one embodiment, the Tx I/Q DAC 471 may convert the digital signal modulated by the modem into a balanced I/Q signal and transmit the balanced I/Q signal to the first RF circuit 450. In one embodiment, the Rx I/Q ADC 472 may convert the balanced I/Q signal converted by the first RF circuit 450 into a digital signal and transmit the digital signal to the modem.

According to various embodiments, the communication processor 470 may perform multi input multi output (MIMO). An embodiment associated with this will be described later with reference to FIG. 7.

According to various embodiments, the communication processor 470 may be implemented in the form of a separate chip, or may be implemented, in the form of one chip, integrally with another chip (e.g., the first RF circuit 450). According to various embodiments, the communication circuit 400a, 400b, or 400c may further include an RFIC and an IFIC.

In one embodiment, the first RF circuit 450 may be electrically connected to the communication processor 470. The first RF circuit 450 may be configured to generate an IF signal having a first frequency, an LO signal of a second frequency, and a control signal of a third frequency.

In one embodiment, the third RF circuit 420 receives an IF signal from the first RF circuit 450, up-converts the IF signal, and transmits the up-converted signal to the antenna array 441.

In one embodiment, the second RF circuit 430 may be configured to provide a fourth frequency RF signal to the second antenna 415.

In one embodiment, communication circuit 400a, 400b, or 400c may be configured to transmit the IF signal and the RF signal, which is provided to the second antenna 415, via a single electrical path. The single electrical path may include, for example, a coaxial cable.

In one embodiment, the communication circuit 400a, 400b, or 400c may be configured to transmit at least one of an LO signal or a control signal via the single electrical path.

In various embodiments, the communication circuit 400a, 400b, or 400c includes a multiplexer electrically connected to the first RF circuit 450, the second RF circuit 430, and a single electrical path, and a de-multiplexer electrically connected to a single electrical path, the third RF circuit 420, and the second antenna 415.

For example, the multiplexer may combine the IF signal, the LO signal, and the control signal, which are generated from the first RF circuit 450, with the RF signal of the second RF circuit 430 to output the combined signal to the single electronic path. The de-multiplexer may split one of the IF signal, the LO signal, the control signal, and the RF signal from the single electric path and output the split signal to a separate electrical path.

Referring to FIGS. 4A and 4B, according to an embodiment, the first RF circuit 450 may be configured to generate an IF signal having a first frequency, an LO signal of a second frequency lower than the first frequency, and a control signal having a third frequency lower than the second frequency. The second RF circuit 430 may be configured to provide, to the second antenna 415, an RF signal having a fourth frequency higher than the third frequency and lower than the second frequency.

According to an embodiment, the first frequency of the IF signal may be between 8 GHz and 15 GHz. The second frequency of the LO signal may be between 5 GHz and 8 GHz. The third frequency of the control signal may be between 0.1 GHz and 0.6 GHz. The fourth frequency of the RF signal may be between 0.6 GHz and 5 GHz.

Referring to FIG. 4A, the multiplexer device may include a multiplexer 490a and a de-multiplexer 490b. For example, the multiplexer 490a and the de-multiplexer 490b may include a quadplexer. For example, the RF signal, the IF signal, the control signal, or the LO signal may have different frequencies to be split by the quadplexer.

Referring to FIG. 4B, the communication circuit 400a, 400b, or 400c may include a first extractor 491a-2 electrically connected to the first RF circuit 450, the second RF circuit 430, and the single electrical path, and a second extractor 491b-2 electrically connected to the third RF circuit 420, the second antenna 415, and a single electrical path.

For example, the fourth frequency of the RF signal is interposed among the first frequency to the third frequency to be split by the first extractor 491a-2 and the second extractor 491b-2. For example, the first extractor 491a-2 and the second extractor 491b-2 may include a notch filter.

In an embodiment, the multiplexer device of the communication circuit 400a, 400b, or 400c may include triplexers 491a-1 and 491b-1 and the notch filters 491a-2 and 491b-2. For example, the triplexer 491a-1 may be included in the first RF circuit 450, and the triplexer 491b-1 may be included in the third RF circuit 420. For another example, the triplexer 491a-1 or the triplexer 491b-1 may not be included in the first RF circuit 450 or the third RF circuit 420. The RF signals transmitted and received between the second antenna 415 and the second RF circuit 430 are extracted by the notch filters 491a-2 and 491b-2, and the IF signal, the control signal, and the LO signal transmitted and received between the first RF circuit 450 and the third RF circuit 420 may be split by the triplexers 491a-1 and 491b-1.

Referring to FIG. 4C, a first diplexer 492a-2 electrically connected to the first RF circuit 450, the second RF circuit 430, and the single electric path and a second diplexer 492b-1 electrically connected to the third RF circuit 420, the second antenna 415, and the single electric path may be included.

For example, when the fourth frequency of the RF signal is higher or lower than the first to third frequencies, the RF signal may be split by the diplexer 492a-2 or 492b-2.

In one embodiment, multiplexer devices of the communication circuits 400a, 400b, and 400c may include the triplexers 492a-1 and 492b-1 and the diplexers 492a-2 and 492b-2. For example, the triplexer 492a-1 may be included in the first RF circuit 450, and the triplexer 492b-1 may be included in the third RF circuit 420. For another example, the triplexer 492a-1 or the triplexer 492b-1 may not be included in the first RF circuit 450 or the third RF circuit 420. The RF signals transmitted and received between the second antenna 415 and the second RF circuit 430 are split by diplexers 492a-2 and 492b-2, and the IF signal, the control signal, and the LO signal transmitted and received between the first RF circuit 450 and the third RF circuit 420 may extracted by the triplexers 492a-1 and 492b-1.

Figure 5:
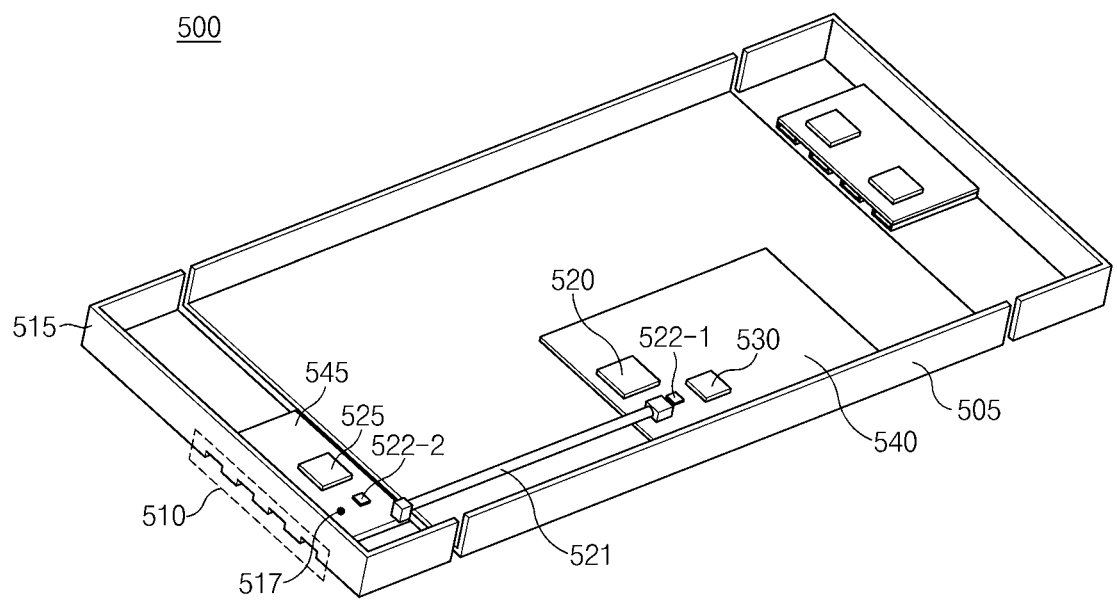
FIG. 5 is a perspective view of an electronic device, according to an embodiment of the disclosure.

FIG. 5 is a perspective view of an electronic device, according to an embodiment of the disclosure.

Referring to FIG. 5, according to an embodiment, an electronic device 600 (e.g., the electronic device 100 of FIG. 1A) may include a housing 505, the antenna array 510 (e.g., the first antenna element 110 of FIG. 1B, the antenna array 441 of FIG. 4A), a third RF circuit 525 (e.g., the third RF circuit 125a of FIG. 1B) for the antenna array 510, a first RF circuit 520 (e.g., the first RF circuit 120 of FIG. 1A) for the antenna array 510, a second antenna element 515, a second RF circuit 530 (e.g., the second RF circuit 130 of FIG. 1A) for the second antenna element 515, a cable 521, a multiplexer 522-1, a de-multiplexer 522-2, a main PCB 540, and a sub-PCB 545.

For example, each of the antenna array 510, the third RF circuit 525, the second antenna element 515, the second RF circuit 530 and the first RF circuit 520 may correspond to the first antenna element 110, the third RF circuit 125a, the second antenna element 115, the second RF circuit 130, and the first RF circuit 120 of FIGS. 1A and 1B, respectively.

In one embodiment, the first RF circuit 520, the second RF circuit 530, and the multiplexer 522-1 may be disposed on the main PCB 540. An application processor or a communication processor (e.g., the processor 142 of FIG. 1A and the communication processor 470 of FIG. 4A) may be disposed on the main PCB 540.

In one embodiment, the third RF circuit 525 and the de-multiplexer 522-2 may be disposed on the sub-PCB 545. The sub-PCB 545 may be disposed to be adjacent to the antenna array 510. The antenna array 510 may transmit and receive a signal in a high frequency band of 20 GHz or more. For example, the antenna array 510, the third RF circuit 525, and the sub-PCB 545 may be referred to as the RF module 125 of FIGS. 1A and 1B. The antenna array 510 may be referred to as a 5G antenna.

Referring to FIG. 5, the antenna array 510 disposed to be adjacent to a bezel area of the housing 505 is illustrated. The sub-PCB 545 may be positioned to be adjacent to the bezel area such that the third RF circuit 525 for the antenna array 510 is disposed to be adjacent to the antenna array 510. For example, the housing 505 may have at least a portion of an opening or a non-conductive portion to correspond to the antenna array 510.

In one embodiment, when the second antenna element 515 is formed to be adjacent to the housing 505, a feeding terminal 517 for the second antenna element 515 may be disposed on the sub-PCB 545. Referring to FIG. 5, the second antenna element 515 formed in the metal bezel area of the housing 505 is illustrated. For example, the RF signal transmitted from the second RF circuit 530 through the cable 521 is split by the de-multiplexer 522-2 and transmitted to the second antenna element 515 through the feeding terminal 517.

Figure 6:
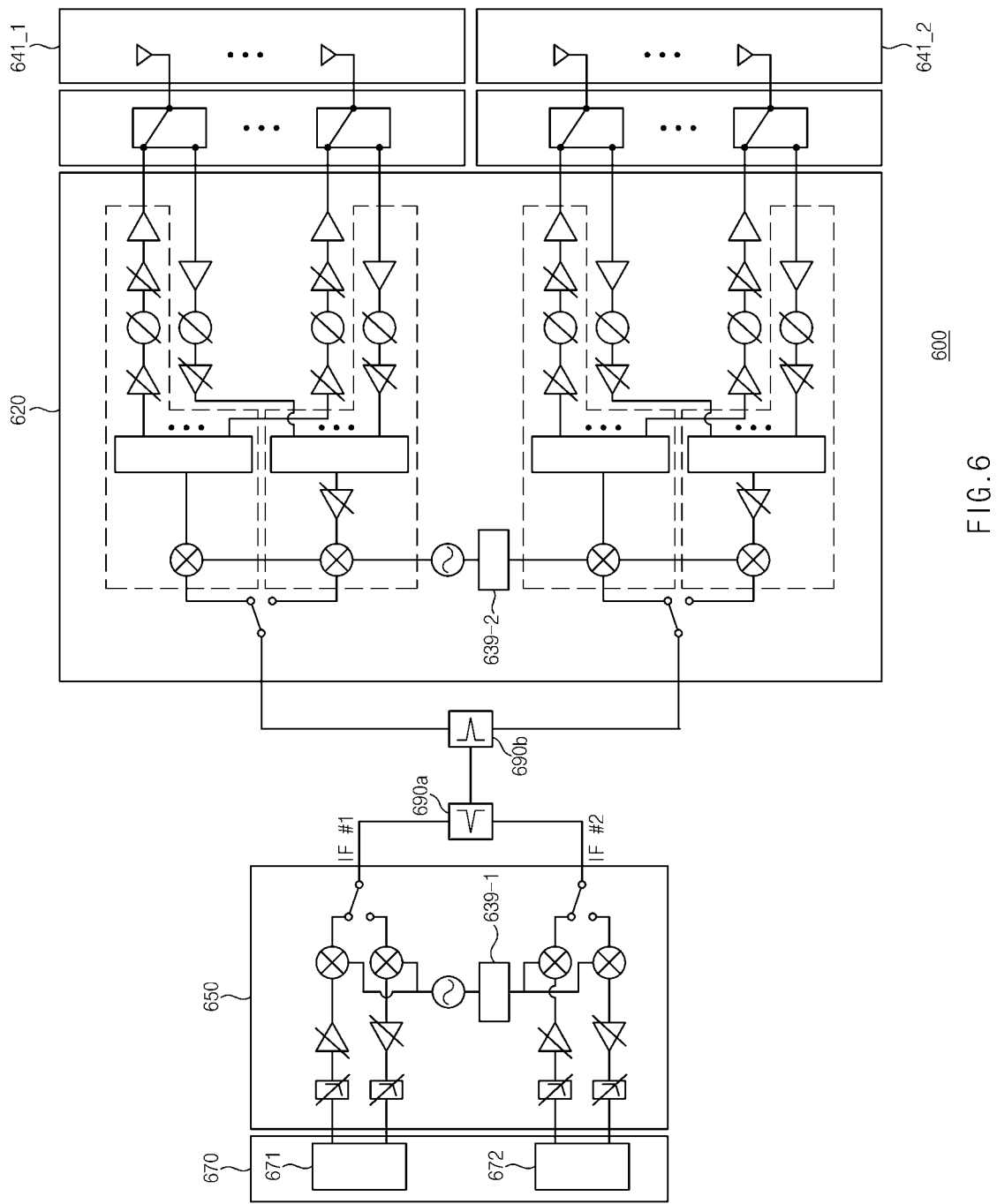
FIG. 6 is a circuit diagram of a communication circuit to process a plurality of IF signals and a plurality of RF signals, according to various embodiments of the disclosure.

FIG. 6 is a circuit diagram illustrating a communication circuit to process a plurality of IF signals and a plurality of RF signals, according to various embodiments of the disclosure.

Referring to FIG. 6, a communication circuit 600 may include an RFIC 620 (e.g., the third RF circuit 125a of FIG. 1B) for a first antenna array 641_1 and a second antenna array 641_2, and an IFIC 650 (e.g., the first RF circuit 120 of FIG. 1A). In the following description of the communication circuit 600 of FIG. 6, the duplicated description of the communication circuit 400 of FIGS. 4A to 4B will be omitted. The IFIC 650 of FIG. 6 may correspond to the first RF circuit 450 of FIG. 4, and the RFIC 620 of FIG. 6 may correspond to the third RF circuit 420 of FIG. 4

In one embodiment, a communication processor 670 may perform multi input multi output (MIMO). A data stream for a first antenna array 641_1 and a data stream for a second antenna array 641_2 may be transmitted to the antenna arrays 641_1 and 641_2, respectively.

In one embodiment, a first IF signal and a second IF signal may be transmitted and received through a single cable between the IFIC 650 and the RFIC 620. For example, the first IF signal and the second IF signal may have adjacent frequency bands. The IFIC 650 and RFIC 620 may generate, by using a local oscillator and frequency multipliers 639-1 and 639-2, LO signals to be supplied to a mixer, and generate the first IF signal and the second IF signal having the adjacent frequency bands to be transmitted and received. A non-negative real value may be applied to the frequency multipliers 639-1 and 639-2

In one embodiment, the first IF signal and the second IF signal may be split by diplexers 690a and 690b. However, the disclosure is not limited thereto, and the communication circuit 600 may include a multiplexer or a notch filter.

According to various embodiments, an electronic device (e.g., the electronic device 100 of FIG. 1A) may include a housing (e.g., the housing 105 of FIG. 1A), a first antenna element (e.g., the first antenna element 110 of FIG. 1B) provided in a first position inside the housing, a second antenna element (e.g., the second antenna element 115 of FIG. 1A) provided on the housing or in a second position inside the housing, a communication processor (CP) (e.g., the processor 140 of FIG. 1A), and at least one communication circuit positioned inside the housing and electrically connected to the first antenna element and the second antenna element. The at least one communication circuit may include a first RF circuit (e.g., the first RF circuit 120 of FIG. 1A) electrically connected to the communication processor CP and configured to generate an IF signal having a first frequency, a local oscillation (LO) signal having a second frequency lower than the first frequency, and a control signal having a third frequency lower than the second frequency, a second RF circuit (e.g., the second RF circuit 130 of FIG. 1A) configured to provide an RF signal, which has a fourth frequency higher than the third frequency and lower than the second frequency, to the second antenna element, and a third RF circuit (e.g., the third RF circuit 125a of FIG. 1B) configured to receive the IF signal from the first RF circuit, up-convert the IF signal, and provide the up-converted signal to the first antenna element. The at least one communication circuit may be configured to transmit the IF signal and the RF signal via a single electrical path.

According to various embodiments, wherein the single electrical path may include a coaxial cable (e.g., the cable 121 of FIG. 1A).

According to various embodiments, the at least one communication circuit may be configured to transmit at least one of the LO signal or the control signal via the single electrical path.

According to various embodiments, the first frequency may be in a range of 8 GHz and 15 GHz. According to various embodiments, the second frequency may be in a range of 5 GHz and 8 GHz. According to various embodiments, the third frequency may be in a range of 0.1 GHz and 0.6 GHz, According to various embodiments, the fourth frequency may be in a range of 0.6 GHz and 5 GHz.

According to various embodiments, the at least one communication circuit may include a multiplexer (e.g., the multiplexer 490a of FIG. 4A) electrically connected to the first RF circuit, the second RF circuit, and the single electrical path, and a de-multiplexer (e.g., the de-multiplexer 490b of FIG. 4A) electrically connected to the single electrical path, the third RF circuit, and the second antenna element.

According to various embodiments, the at least one communication circuit may include a first extractor (e.g., the first extractor 491a-2 of FIG. 4B) electrically connected to the first RF circuit, the second RF circuit and the single electrical path and a second extractor (e.g., the second extractor 491b-2 of FIG. B) electrically connected to the third RF circuit, the second antenna element, and the single electrical path.

According to various embodiments, the at least one communication circuit may further include a first diplexer (e.g., the first diplexer 492a-2 of FIG. 4C) electrically connected to the first RF circuit, the second RF circuit, and the single electrical path, and a second diplexer (e.g., the second diplexer 492b-1 of FIG. 4C) electrically connected to the third RF circuit, the second antenna element, and the single electrical path.

According to various embodiments, the first extractor and the second extractor are configured to extract the RF signal.

According to various embodiments, the first diplexer and the second diplexer may be configured to split the RF signal.

According to various embodiments, the at least one communication circuit may further include a multiplexer (e.g., the multiplexer 490a of FIG. 4A) included in the first RF circuit, and a de-multiplexer (e.g., the de-multiplexer 490b of FIG. 4A) included in the third RF circuit.

According to various embodiments disclosed in the disclosure, an electronic device (e.g., the electronic device 100 of FIG. 1A) may include a housing (e.g., the housing 105 of FIG. 1A), a first antenna element (e.g., the first antenna element 110 of FIG. 1B) disposed to be adjacent to the housing, a first RF circuit (e.g., the third RF circuit 125a of FIG. 1B) disposed to be adjacent to the first antenna element, and electrically connected to the first antenna element, a second antenna element (e.g., the second antenna element 115 of FIG. 1A) formed on the housing, or received inside the housing, a second RF circuit (e.g., the second RF circuit 130 of FIG. 1A) connected to the second antenna element through a cable (e.g., the cable 121 of FIG. 1A), an IF circuit (e.g., the first RF circuit 120 of FIG. 1A) connected to the first RF circuit through the cable, and disposed to be adjacent to the second RF circuit, at least one multiplexer device (e.g., the multiplexer devices 122-1 and 122-2 of FIG. 1A) electrically connected to the cable, to split a second RF signal associated with the second RF circuit, and an IF signal associated with the IF circuit, and at least one processor (e.g., the processor 140 of FIG. 1A) electrically connected to the first RF circuit, the second RF circuit, and the IF circuit. The at least one processor may be configured to receive the IF signal split by the at least one multiplexer device using the first RF circuit or the IF circuit, receive the second RF signal split by the at least one multiplexer device using the second antenna element or the second RF circuit, transmit and receive the first RF signal in a frequency band of 20 GHz or more using the first antenna element, the IF circuit, and the first RF circuit, and transmit and receive the second RF signal in a frequency band of 6 GHz or less using the second antenna element and the second RF circuit.

According to various embodiments, the at least one processor may be configured to, using the first RF circuit, up-convert the IF signal received from the IF circuit to the first RF signal, and transmit the up-converted first RF signal to the first antenna element through the cable, and down-convert the first RF signal received from the first antenna element to the IF signal, and transmit the down-converted IF signal to the IF circuit through the cable.

According to various embodiments, the electronic device may further include a third antenna element (e.g., the third antenna elements 312-1 and 312-2) formed on the housing or received in the housing; and a third RF circuit (e.g., the fourth RF circuit 327 of FIG. 3) connected to the third antenna element through the cable and disposed to be adjacent to the second RF circuit. The at least one processor may be configured to receive a third RF signal split by the at least one multiplexer device using the third antenna element or the third RF circuit, and transmit and receive the third RF signal in a frequency band of 6 GHz or less using the third antenna element and the third RF circuit.

According to various embodiments, the third RF signal may have a bandwidth wider than the second RF signal.

According to various embodiments, the at least one multiplexer device may be configured to split the second RF signal, the IF signal generated from the IF circuit, the control signal generated from the IF circuit, and the LO signal generated from the IF circuit, and the at least one processor may be configured to allow the first RF circuit or the IF circuit to receive the control signal or the LO signal split using the at least one multiplexer device.

According to various embodiments, the at least one multiplexer device may be a quadplexer (e.g., the multiplexer 490a or a de-multiplexer 490b of FIG. 4A).

According to various embodiments, the third RF signal may have a bandwidth of 100 MHz or more.

Figure 7:
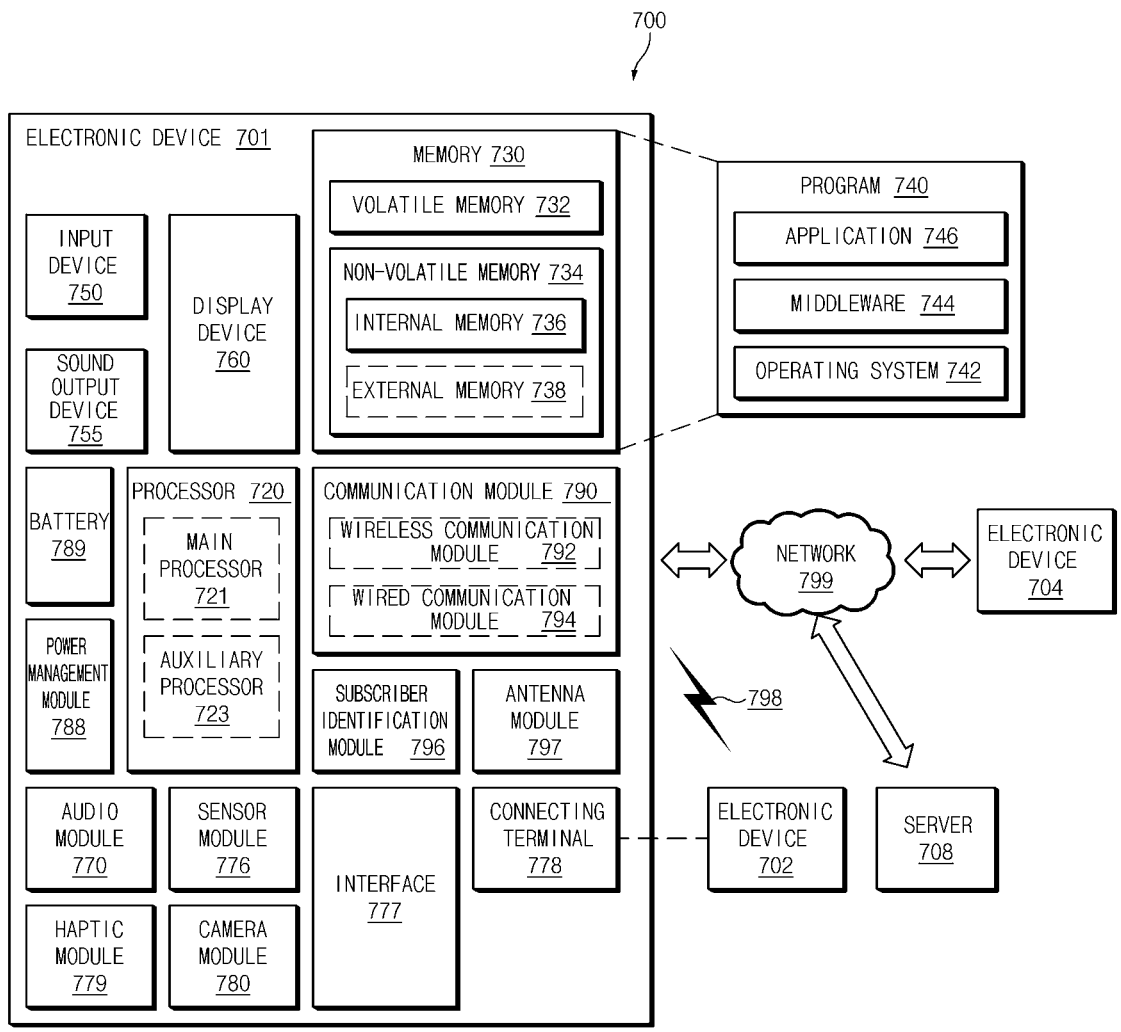
FIG. 7 is a block diagram illustrating an electronic device in a network environment, according to various embodiments.

FIG. 7 is a block diagram of an electronic device in a network environment according to various embodiments.

Referring to FIG. 7, an electronic device 701 may communicate with an electronic device 702 through a first network 798 (e.g., a short-range wireless communication) or may communicate with an electronic device 704 or a server 708 through a second network 799 (e.g., a long-distance wireless communication) in a network environment 700. According to an embodiment, the electronic device 701 may communicate with the electronic device 704 through the server 708. According to an embodiment, the electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module 796, and an antenna module 797. According to some embodiments, at least one (e.g., the display device 760 or the camera module 780) among components of the electronic device 701 may be omitted or other components may be added to the electronic device 701. According to some embodiments, some components may be integrated and implemented as in the case of the sensor module 776 (e.g., a fingerprint sensor, an iris sensor, or an illuminance sensor) embedded in the display device 760 (e.g., a display).

The processor 720 may operate, for example, software (e.g., a program 740) to control at least one of other components (e.g., a hardware or software component) of the electronic device 701 connected to the processor 720 and may process and compute a variety of data. The processor 720 may load a command set or data, which is received from other components (e.g., the sensor module 776 or the communication module 790), into a volatile memory 732, may process the loaded command or data, and may store result data into a nonvolatile memory 734. According to an embodiment, the processor 720 may include a main processor 721 (e.g., a central processing unit or an application processor) and an auxiliary processor 723 (e.g., a graphic processing device, an image signal processor, a sensor hub processor, or a communication processor), which operates independently from the main processor 721, additionally or alternatively uses less power than the main processor 721, or is specified to a designated function. In this case, the auxiliary processor 723 may operate separately from the main processor 721 or embedded.

In this case, the auxiliary processor 723 may control, for example, at least some of functions or states associated with at least one component (e.g., the display device 760, the sensor module 776, or the communication module 790) among the components of the electronic device 701 instead of the main processor 721 while the main processor 721 is in an inactive (e.g., sleep) state or together with the main processor 721 while the main processor 721 is in an active (e.g., an application execution) state. According to an embodiment, the auxiliary processor 723 (e.g., the image signal processor or the communication processor) may be implemented as a part of another component (e.g., the camera module 780 or the communication module 790) that is functionally related to the auxiliary processor 723. The memory 730 may store a variety of data used by at least one component (e.g., the processor 720 or the sensor module 776) of the electronic device 701, for example, software (e.g., the program 740) and input data or output data with respect to commands associated with the software. The memory 730 may include the volatile memory 732 or the nonvolatile memory 734.

The program 740 may be stored in the memory 730 as software and may include, for example, an operating system 742, a middleware 744, or an application 746.

The input device 750 may be a device for receiving a command or data, which is used for a component (e.g., the processor 720) of the electronic device 701, from an outside (e.g., a user) of the electronic device 701 and may include, for example, a microphone, a mouse, or a keyboard.

The sound output device 755 may be a device for outputting a sound signal to the outside of the electronic device 701 and may include, for example, a speaker used for general purposes, such as multimedia play or recordings play, and a receiver used only for receiving calls. According to an embodiment, the receiver and the speaker may be either integrally or separately implemented.

The display device 760 may be a device for visually presenting information to the user of the electronic device 701 and may include, for example, a display, a hologram device, or a projector and a control circuit for controlling a corresponding device. According to an embodiment, the display device 760 may include a touch circuitry or a pressure sensor for measuring an intensity of pressure on the touch.

The audio module 770 may convert a sound and an electrical signal in dual directions. According to an embodiment, the audio module 770 may obtain the sound through the input device 750 or may output the sound through an external electronic device (e.g., the electronic device 702 (e.g., a speaker or a headphone)) wired or wirelessly connected to the sound output device 755 or the electronic device 701.

The sensor module 776 may generate an electrical signal or a data value corresponding to an operating state (e.g., power or temperature) inside or an environmental state outside the electronic device 701. The sensor module 776 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 777 may support a designated protocol wired or wirelessly connected to the external electronic device (e.g., the electronic device 702). According to an embodiment, the interface 777 may include, for example, an HDMI (high-definition multimedia interface), a USB (universal serial bus) interface, an SD card interface, or an audio interface.

A connecting terminal 778 may include a connector that physically connects the electronic device 701 to the external electronic device (e.g., the electronic device 702), for example, an HDMI connector, a USB connector, an SD card connector, or an audio connector (e.g., a headphone connector).

The haptic module 779 may convert an electrical signal to a mechanical stimulation (e.g., vibration or movement) or an electrical stimulation perceived by the user through tactile or kinesthetic sensations. The haptic module 779 may include, for example, a motor, a piezoelectric element, or an electric stimulator.

The camera module 780 may shoot a still image or a video image. According to an embodiment, the camera module 780 may include, for example, at least one lens, an image sensor, an image signal processor, or a flash.

The power management module 788 may be a module for managing power supplied to the electronic device 701 and may serve as at least a part of a power management integrated circuit (PMIC).

The battery 789 may be a device for supplying power to at least one component of the electronic device 701 and may include, for example, a non-rechargeable (primary) battery, a rechargeable (secondary) battery, or a fuel cell.

The communication module 790 may establish a wired or wireless communication channel between the electronic device 701 and the external electronic device (e.g., the electronic device 702, the electronic device 704, or the server 708) and support communication execution through the established communication channel. The communication module 790 may include at least one communication processor operating independently from the processor 720 (e.g., the application processor) and supporting the wired communication or the wireless communication. According to an embodiment, the communication module 790 may include a wireless communication module 792 (e.g., a cellular communication module, a short-range wireless communication module, or a GNSS (global navigation satellite system) communication module) or a wired communication module 794 (e.g., an LAN (local area network) communication module or a power line communication module) and may communicate with the external electronic device using a corresponding communication module among them through the first network 798 (e.g., the short-range communication network such as a Bluetooth, a WiFi direct, or an IrDA (infrared data association)) or the second network 799 (e.g., the long-distance wireless communication network such as a cellular network, an internet, or a computer network (e.g., LAN or WAN)). The above-mentioned various communication modules 790 may be implemented into one chip or into separate chips, respectively.

According to an embodiment, the wireless communication module 792 may identify and authenticate the electronic device 701 using user information stored in the subscriber identification module 796 in the communication network.

The antenna module 797 may include one or more antennas to transmit or receive the signal or power to or from an external source. According to an embodiment, the communication module 790 (e.g., the wireless communication module 792) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 701 and the external electronic device 704 through the server 708 connected to the second network 799. Each of the electronic devices 702 and 704 may be the same or different types as or from the electronic device 701. According to an embodiment, all or some of the operations performed by the electronic device 701 may be performed by another electronic device or a plurality of external electronic devices. When the electronic device 701 performs some functions or services automatically or by request, the electronic device 701 may request the external electronic device to perform at least some of the functions related to the functions or services, in addition to or instead of performing the functions or services by itself. The external electronic device receiving the request may carry out the requested function or the additional function and transmit the result to the electronic device 701. The electronic device 701 may provide the requested functions or services based on the received result as is or after additionally processing the received result. To this end, for example, a cloud computing, distributed computing, or client-server computing technology may be used.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 740) including an instruction stored in a machine-readable storage media (e.g., an internal memory 736 or an external memory 738) readable by a machine (e.g., a computer). The machine may be a device that calls the instruction from the machine-readable storage media and operates depending on the called instruction and may include the electronic device (e.g., the electronic device 701). When the instruction is executed by the processor (e.g., the processor 720), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
a housing;
a first antenna element provided in a first position inside the housing;
a second antenna element provided on the housing or in a second position inside the housing;
a communication processor (CP); and
at least one communication circuit positioned inside the housing and electrically connected to the first antenna element and the second antenna element,
wherein the at least one communication circuit includes:
a first radio frequency (RF) circuit electrically connected to the communication processor (CP) and configured to generate an intermediate frequency (IF) signal having a first frequency, a local oscillation (LO) signal having a second frequency lower than the first frequency, and a control signal having a third frequency lower than the second frequency;
a second RF circuit configured to provide an RF signal of a fourth frequency higher than the third frequency and lower than the second frequency, to the second antenna element; and
a third RF circuit configured to receive the IF signal from the first RF circuit, up-convert the IF signal, and provide an up-converted signal to the first antenna element, and
wherein the at least one communication circuit is configured to transmit the IF signal and the RF signal via a single electrical path.

2. The electronic device of claim 1, wherein the single electrical path includes:
a coaxial cable.

3. The electronic device of claim 2, wherein the at least one communication circuit is configured to transmit at least one of the LO signal or the control signal via the single electrical path.

4. The electronic device of claim 1, wherein the first frequency has a frequency band of 8 GHz or more and less than 15 GHz,
wherein the second frequency has a frequency band of 5 GHz or more and less than 8 GHz,
wherein the third frequency has a frequency band of 0.1 GHz or more and less than 0.6 GHz, and
wherein the fourth frequency has a frequency band of 0.6 GHz or more and less than 5 GHz.

5. The electronic device of claim 1, wherein the at least one communication circuit includes:
a multiplexer electrically connected to the first RF circuit, the second RF circuit, and the single electrical path; and
a de-multiplexer electrically connected to the single electrical path, the third RF circuit, and the second antenna element.

6. The electronic device of claim 1, wherein the at least one communication circuit includes:
a first extractor electrically connected to the first RF circuit, the second RF circuit, and the single electrical path, and configured to extract the RF signal; and
a second extractor electrically connected to the third RF circuit, the second antenna element, and the single electrical path and configured to extract the RF signal.

7. The electronic device of claim 6, wherein the at least one communication circuit further includes:
a multiplexer included in the first RF circuit; and
a de-multiplexer included in the third RF circuit.

8. The electronic device of claim 1, wherein the at least one communication circuit further includes:
a first diplexer electrically connected to the first RF circuit, the second RF circuit, and the single electrical path; and
a second diplexer electrically connected to the third RF circuit, the second antenna element, and the single electrical path.

9. The electronic device of claim 8, wherein the at least one communication circuit further includes:
a multiplexer included in the first RF circuit; and
a de-multiplexer included in the third RF circuit.

10. The electronic device of claim 8, wherein the first diplexer and the second diplexer are configured to split the RF signal.

11. An electronic device comprising:
a housing;
a first antenna element disposed to be adjacent to the housing;
a first RF circuit disposed to be adjacent to the first antenna element, and electrically connected to the first antenna element;
a second antenna element formed on the housing, or received inside the housing;
a second RF circuit connected to the second antenna element through a cable;
an IF circuit connected to the first RF circuit through the cable, and disposed to be adjacent to the second RF circuit;
at least one multiplexer device electrically connected to the cable to split a second RF signal associated with the second RF circuit, and an IF signal associated with the IF circuit; and
at least one processor electrically connected to the first RF circuit, the second RF circuit, and the IF circuit,
wherein the at least one processor is configured to:
receive the IF signal split by the at least one multiplexer device using the first RF circuit or the IF circuit, receive the second RF signal split by the at least one multiplexer device using the second antenna element or the second RF circuit, transmit and receive the first RF signal in a frequency band of 20 GHz or more using the first antenna element, the IF circuit, and the first RF circuit, and transmit and receive the second RF signal in a frequency band of 6 GHz or less using the second antenna element and the second RF circuit.

12. The electronic device of claim 11, wherein the at least one processor is configured to: using the first RF circuit, up-convert the IF signal received from the IF circuit through the cable to the first RF signal, and transmit the up-converted first RF signal to the first antenna element, and down-convert the first RF signal received from the first antenna element to the IF signal, and transmit the down-converted IF signal to the IF circuit through the cable.

13. The electronic device of claim 11, further comprising:

a third antenna element formed on the housing or received in the housing; and a third RF circuit connected to the third antenna element through the cable and disposed to be adjacent to the second RF circuit, wherein the at least one processor is configured to:

receive a third RF signal split by the at least one multiplexer device using the third antenna element or the third RF circuit, and transmit and receive a third RF signal in a frequency band of 6 GHz or less using the third antenna element and the third RF circuit.

14. The electronic device of claim 13, wherein the third RF signal has a bandwidth wider than the second RF signal.

15. The electronic device of claim 14, wherein the third RF signal has a bandwidth of 100 MHz or more.

16. The electronic device of claim 11, wherein the at least one multiplexer device is configured to:

split the second RF signal, the IF signal generated from the IF circuit, a control signal generated from the IF circuit, and a local oscillation (LO) signal generated from the IF circuit, and wherein the at least one processor is configured to:

allow the first RF circuit or the IF circuit to receive the control signal or the LO signal split using the at least one multiplexer device.

* * * * *